United States Patent [19]

Stoltz

[11] 4,242,910
[45] Jan. 6, 1981

[54] ACCELERATION MONITORING SYSTEM

[75] Inventor: Andries J. Stoltz, Pretoria, South Africa

[73] Assignee: C.W.M. Du Toit Beleggings (Eiendoms) Beperk, Pretoria, South Africa

[21] Appl. No.: 29,741

[22] Filed: Apr. 13, 1979

[51] Int. Cl.³ .............................................. G01P 15/08
[52] U.S. Cl. .............................. 73/516 LM; 73/517 R
[58] Field of Search ........ 33/396; 73/516 LM, 516 R, 73/517 R, 517 A, 653; 250/231 SE, 233, 578

[56] References Cited

U.S. PATENT DOCUMENTS

| 3,234,394 | 2/1966 | Worden | 250/231 SE |
|---|---|---|---|
| 3,643,513 | 2/1972 | Weaver | 73/517 R |
| 3,798,454 | 3/1974 | Weiss | 73/517 R X |
| 4,034,481 | 7/1977 | Stoltz | 33/396 |
| 4,159,577 | 7/1979 | Bergkvist | 73/517 R X |

Primary Examiner—James J. Gill
Attorney, Agent, or Firm—Fitch, Even, Tabin, Flannery & Welsh

[57] ABSTRACT

A monitoring system comprises a sensor responsive to acceleration in a predetermined plane and an electronic circuit responsive to the sensor for indicating details of the acceleration. The sensor has a float structure immersed in liquid in a casing and mounted for pivotal movement when the sensor is subjected to acceleration in the predetermined plane. The float structure has a pair of spaced floats having centers of bouyancy above and one on each side of an axis of rotation for biassing the float structure to a datum position. Openings are provided in the float structure at different angular positions about the axis of rotation.

The electronic circuit has detectors located in the casing with components on opposite sides of the structure for operating in a first mode when the float structure is interposed between the components and in a second mode when an opening is between the components so that the circuit will indicate differing degrees of acceleration in dependence on the degree of movement of the float structure.

Two sensors may be provided at right angles to one another to indicate acceleration in two directions.

10 Claims, 4 Drawing Figures

ACCELERATION MONITORING SYSTEM

This invention relates to a monitoring system which is sensitive to accelerations and can be used an an accelerometer.

Instruments which react and give a reading when subjected to accelerative forces are widely known. In some forms the reading obtained is a direct indication of the accelerative force applied and the so-called G-meter on a fighter aircraft is of this type. In other forms, the reading obtained is indicative of the change in attitude which has resulted from the accelerative force. In this connection reference can be made to attitude sensitive instruments in submarines and to the "bank and turn" indicators in aircraft.

The instrument of U.S. Pat. No. 3,559,294 (Bauer) comprises a pair of floats which are on arms projecting to each side of a rotatably mounted shaft. The shaft and floats are within a casing which is filled with mercury, water or oil to a level such that each float is partly submerged. If subjected to violent accelerative forces, the liquid flows rapidly from side-to-side in the casing and in so doing causes the floats to oscillate wildly with respect to the casing. The results in fluctuating output signals and there is consequently a period of time during which the instrument is completely unreliable for it is producing a signal which calls first for a maximum correction in one direction and then for a maximum correction in the other direction. No acceleration monitoring system can utilise such output signals in a proper manner.

Bauer has attempted to overcome this problem by providing two float chambers separated by a narrow passage. When the instrument tilts, liquid flows from one chamber to the other. This certainly has the effect of damping out the to-and-fro movement which can be imparted to the liquid but at the same time it has a detrimental effect on reaction time. If the instrument is tilted quickly enough, the float structure moves as if it is integral with the casing for there has been no time for liquid to flow from one chamber to the other. Thereafter, liquid flows through the passage and eventually the instrument gives a reading which can indicate the degree of tilt. Because of the slow reaction time, the instrument is often giving an indication of a condition which no longer exists and cannot be used for monitoring acceleration.

In order to overcome certain difficulties arising with the Bauer instrument, it has been proposed in U.S. Pat. No. 4,034,481 to provide an instrument having a submerged pair of floats mounted in a casing on a structure which is pivotable with a spindle. Transmission gearing is provided for mechanically operating a visual indicator to avoid the problems that arise from the Bauer potentiometer system, particularly for tilt-measurement. The inertia of the transmission gearing can, however, delay or dampen any response and it is desirable to provide a still further improved system for monitoring accelerations. Although an arrangement including proximity detectors responsive to an element extending from the casing, this arrangement is not practical for all purposes.

The present invention aims to provide an acceleration monitoring system which has a rapid response and which can be relatively inexpensive compared with prior art instruments. It is also a secondary aim to provide a system in which details of accelerations of predetermined magnitudes can be indicated and recorded and in which the ranges can optionally be adjustable.

According to the invention, there is provided monitoring system comprising:

(A) a sensor responsive to acceleration in a predetermined plane and comprising
 a liquid-filled casing,
 a float structure immersed in the liquid in the casing and mounted for pivotal movement about a generally horizontal axis of rotation when the sensor is subjected to acceleration in the predetermined plane, the float structure comprising a pair of spaced floats having centres of buoyancy above and one on each side of the axis of rotation for biassing the float structure to a position in which a datum line movable with the float structure and passing through the axis of rotation adopts a datum position; and
 openings in the float structure at different distances from the axis of rotation, at least some of the openings terminating at different angular positions about the axis of rotation; and (B) means responsive to the sensor for indicating details of acceleration, the responsive means comprising detectors located in the casing at the same distances from the axis as respective openings and each having components on opposite sides of the structure for operating in a first mode when the float structure is interposed between the components and in a second mode when an opening is between the components so that the responsive means will detect differing degrees of acceleration in dependence on the degree of movement of the float structure.

The openings are elongate slots in the float structure and are located on each side of the datum line so that the system can detect both acceleration and deceleration, and the detectors can be located substantially in alignment with the datum position. If the slots are provided in replaceable elements in said float structure, it is simple to adjust the ranges of acceleration which can be detected.

The components of each detector may comprise a photo emitter located on one side of the float structure and a photo sensor located on the other side of the float structure, the photo emitter directing a light beam towards the photo sensor.

The responsive means may include an electronic circuit having a plurality of display units each arranged to display and record details of signals received thereby when a respective predetermined range of acceleration is indicated by the float structure. The electronic circuit may also include means for causing the display units to display a signal, each time an acceleration sufficient to actuate a display device is indicated by the float structure, only in the display unit corresponding to the predetermined range of highest acceleration indicated by the float structure. In this way, the details of the greatest acceleration range achieved can be recorded and displayed without having to record details of smaller acceleration ranges achieved when approaching the greatest range.

The responsive means may include means for switching on a warning indicator on a predetermined range of least acceleration being indicated by the float structure.

The present invention also provides a monitoring system comprising a first sensor which is responsive to acceleration in a predetermined plane; a second sensor which is responsive to acceleration in a plane transverse to the predetermined plane; and means responsive to the sensors for indicating details of said accelerations; wherein each sensor comprises a liquid-filled casing and a float structure arranged for rotation about a generally horizontal axis, the axes being transverse to one another; wherein each float structure comprises a pair of spaced floats having centres of bouyancy spaced apart in a horizontal direction to lie one on each side of the respective axis and above the axis for biassing the float structure to a datum condition in which a datum line movable with the float structure and passing through said axis adopted a datum position, said float structure being movable in response to acceleration of the respective sensor; wherein each float structure has slots at least some of which extend to different angular positions spaced from the datum line; and wherein the means responsive to the sensors comprises detectors located in the casings of the two sensors at the same radial distances from the axes as respective slots in the float structure, the detectors in each sensor having components on opposite sides of the float structure of that sensor, the detector being adapted to operate in a first mode when the float structure is interposed between its components and in a second mode when the slots move between its components so that the detectors will detect differing degrees of acceleration in dependence on the degree of movement of the float structure.

One embodiment of the invention will now be described, by way of example, with reference to the accompanying drawings, in which:

FIG. 1 schematically illustrates the sensors of a monitoring device;

Figure 1:
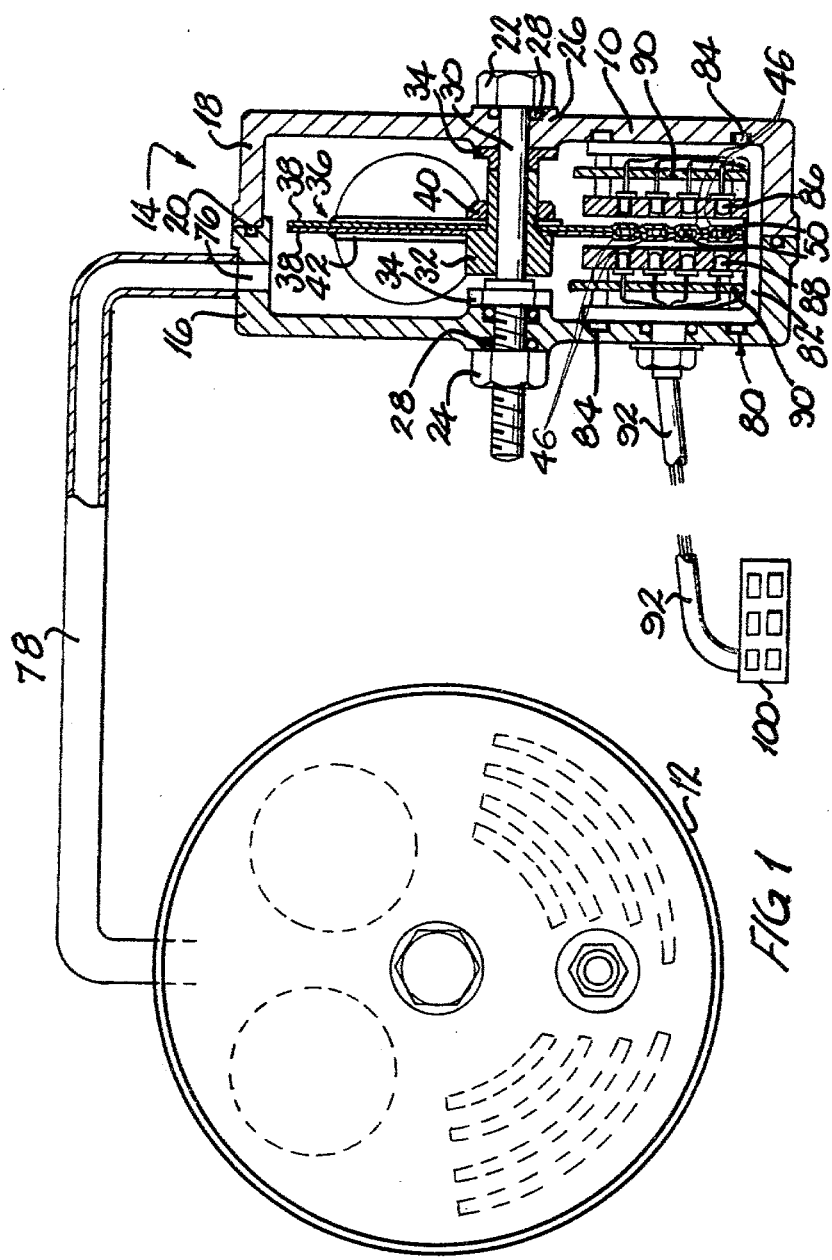

The device illustrated in the drawings includes a linear acceleration sensor 10 and a radial acceleration sensor 12. Both sensors are of similar basic construction and, insofar as they are similar, will be described using like reference numerals for like parts.

Each sensor includes a substantially cylindrical housing 14 formed from two complementary parts 16 and 18 which can be separated approximately at the centre line of the length of the housing. An O-ring seal 20 is provided for forming a seal between the two parts. The parts are held together by a bolt 22 and nut 24, which are co-axial with the housing and are mounted in bushes 26 formed by the housing. O-ring seals 28 seal the housing in the region of the bushes.

A spindle 30 is formed by the shanks of the bolt 22 and the mounting sleeve 32 is freely rotatably mounted on the spindle. The mounting sleeve is spaced from the wall of the housing by suitable spacers 34.

A disc-like plate unit 36 is fixed on and rotatable with the mounting sleeve 32. The plate unit is formed from a pair of plates 38 which are held rigidly together by a nut 40 screwed onto the mounting sleeve 32. The plates are provided with clamping pieces 42 which grip and locate a pair of floats 44, and are also provided with locating formations 46 which accurately locate arcuate ring sections 50. The floats 44 are located 90 degrees apart about the axis of the spindle 30. The locating formations 46 border concentric arcuate slots in the plate unit 36 and the arcuate ring sections are located in these formations to block off parts of the slots and thus to provide final slots with differing lengths as in the plate units shown in FIGS. 2 and 3.

Figure 2:
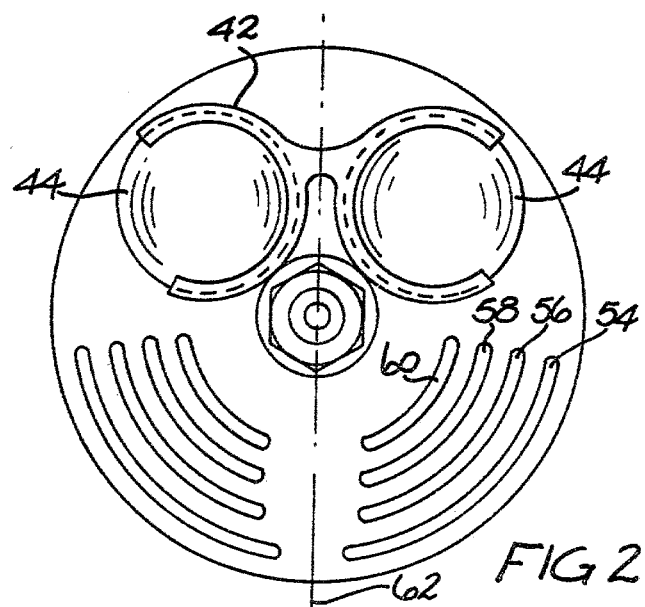
FIG. 2 shows a plate unit of one sensor.

The plate unit shown in FIG. 2 is mounted in the radial acceleration sensor and slots 54, 56, 58 and 60 on the right hand side of a datum line 62 start at angles of 10, 15, 20 and 25 degrees, respectively, from the datum line 62, for example. The slots on the other side of the datum line 62 are mirror images of those on the right hand side of the datum line. The angles may be adjusted as desired by varying the arcuate ring sections 50.

Figure 3:
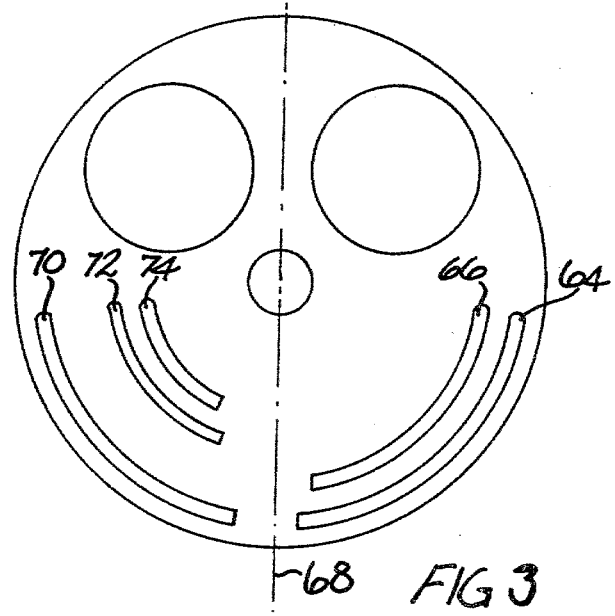
FIG. 3 shows a plate unit of another sensor.

In FIG. 3, the plate unit of the linear acceleration detector has slots 64 and 66 on the right hand side of the datum line 68 to indicate acceleration and slots 70, 72 and 74 on the left hand side of the datum line for indicating braking. The slots 64 and 66 commence at 5 degrees and 10 degrees from the datum line, respectively, and the slots 70, 72 and 74 commence at angles of 10 degrees, 20 degrees and 25 degrees from the datum line. Again these angles may be adjusted by altering arcuate ring sections 50. The plate unit of FIG. 3 is mounted in the linear acceleration sensor with the slots 64 and 66 at the front side of the sensor with respect to the normal direction of travel of the sensor. The sensor 12 is arranged with its plate unit at right angles to the plate unit of the sensor, that is at right angles to the intended direction of travel of the sensor. The floats in the two plate units normally serve to keep the datum lines 62 and 68 vertical because the housings are filled with a suitable oil. The housings include upper openings 76 which are used to connect the sensors by means of suitable flexible tubing 78 and may also be arranged to facilitate oil expansion.

Electronic sensor arrays 80 (one of which is shown in FIG. 1) are mounted in the housings. These arrays include brackets 82 with locating pieces 84 for locating in corresponding locating recesses in the housing. The array includes photo emitters 86 and pick-ups in the form of photo sensors 88 which are aligned along the respective datum line 62 or 68 in the housing when the array is properly located. The array also includes electronic circuitry on printed circuit boards 90 and the boards of both sensors are connected to a counter and display unit circuit 100 by output cables 92. The array is suitably encapsulated in an epoxy resin before being mounted in the housing to prevent oil from affecting the operation of the array.

When the photo emitters and photo sensors are operating, light from the emitters does not reach the photo sensors because they are not aligned with the slots in the respective plate unit. However, when the sensor 10 is subjected to linear acceleration or deceleration of sufficient magnitude or when the sensor 12 moves about a vertical axis so that the respective plate is subjected to sufficient radial acceleration, one or more of the slots will move into alignement with the photo sensor and photo emitter and an appropriate signal will be emitted by the array.

Figure 4:
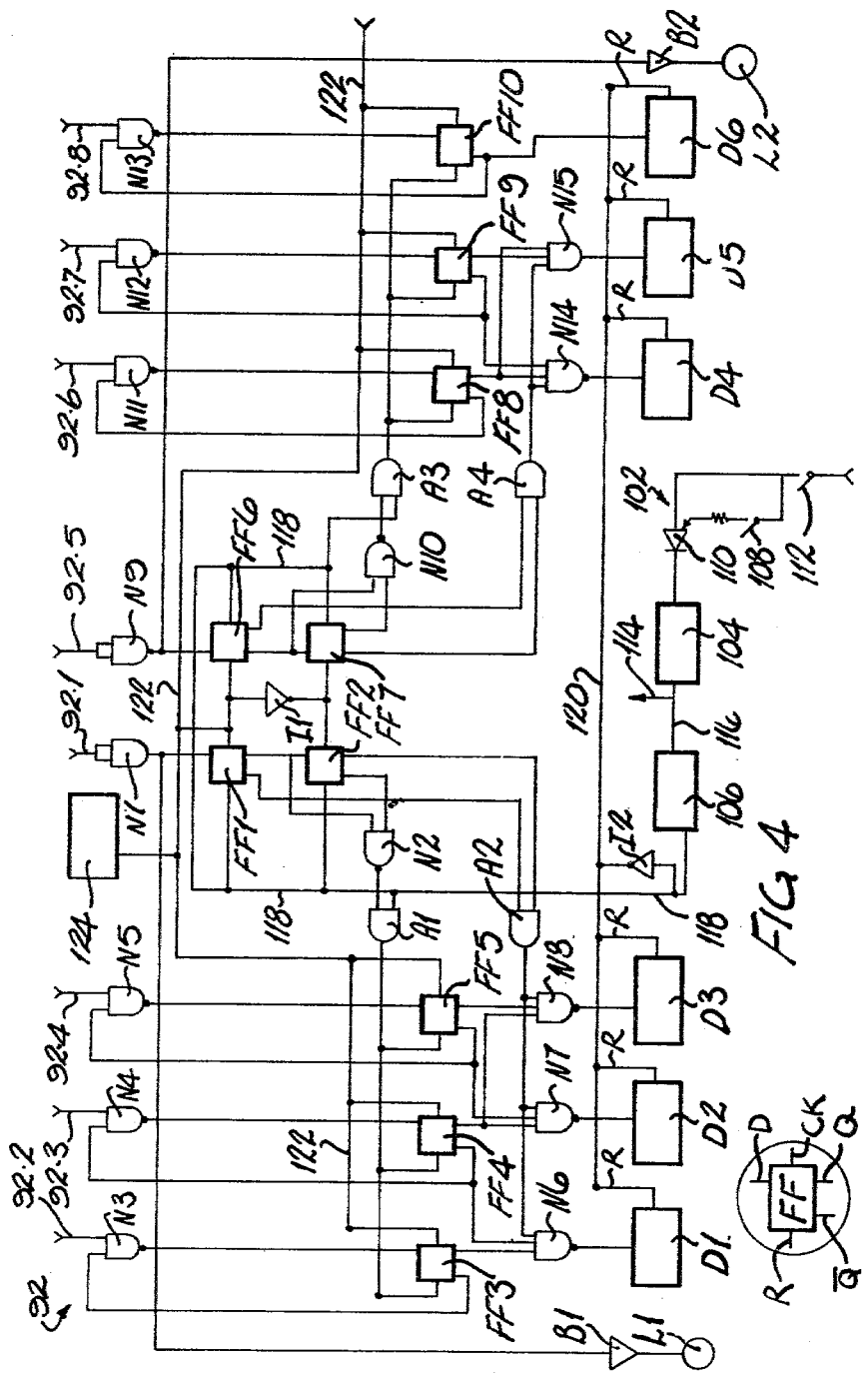
FIG. 4 is a block diagram showing an electronic circuit of the device.

Reference will now be made to FIG. 4, in which the circuit 100 is shown as a block diagram illustrating the counter and display units with the electronic circuitry used to drive them. There are six of such counter and display units, indicated by reference letters D1 through to D6, each being able to count and display up to 99 counts. The circuit 100 further comprises 15 NAND-gates indicated by reference letters N1 through to N15, four AND-gates indicated by reference letters A1 through to A4, ten D-type flip-flop circuits indicated by reference letters FF1 through to FF10, two inverters indicated by reference letters I1 and I2, two buffer amplifiers indicated by reference letters B1 and B2, and two warning lights indicated by reference letters L1 and L2. Furthermore, the circuit 100 comprises a switch on circuit 102, a voltage regulator 104, and a reset circuit 106. Each of the flip-flop circuits FF1 through to FF10 has the normal clock input terminal CK, output terminals Q and Q, a reset terminal R, and a data input D, the notation used for each flip-flop being illustrated in the insert of FIG. 4.

The cables 92 referred to above have a total of eight signal carrying leads indicated in FIG. 4 by reference numerals 92.1 through to 92.8. The leads 92.1 through to 92.8 are each associated with one of the photo sensors for sensing the various slots in the linear acceleration sensor 10 and the radial acceleration sensor 12. The association between the leads and the slots is given in the table below:

| LEAD | SLOT |
| --- | --- |
| 92.1 | 54 |
| 92.2 | 56 |
| 92.3 | 58 |
| 92.4 | 60 |
| 92.5 | 64 and 70 |
| 92.6 | 72 |
| 92.7 | 74 |
| 92.8 | 66 |

The interconnection of the various components of the circuit 100 will be clear from the drawing and from the description of its operation which follows hereafter.

When the vehicle is started, a triggering voltage is applied via its starter switch 108 to a thyristor 110 which forms part of the switch on circuit 102. The thyristor 110 will remain switched on until such time as the key switch 112 is switched off. Power is supplied to the circuit 100 via the key switch 112, the thyristor 110, the voltage regulator 104, and a connection 114. The resetting circuit 106 has its input 116 connected to the output of the regulator 104 and is operative to provide a low resetting voltage on its output 118 whenever the circuit 100 is switched on by means of the starter switch 108. As will be seen in the drawings, the output connection 118 is connected directly to the reset terminals R of the flip-flops FF1, FF2, FF6 and FF7, indirectly via A1 to the reset terminals R of the flip-flops FF3, FF4 and FF5, and indirectly via A3 to the reset terminals R of the flip-flops FF8, FF9 and FF10. Furthermore, the connection 118 is connected via the inverter I2 and a busbar 120 to reset terminals R of each of the counter and display units D1 through to D6. This arrangement will provide a high resetting voltage on the busbar 120 to reset all the counter and display units D1 through to D6 whenever the circuit 100 is switched on by operation of the starter switch 108.

When there is sufficient centrifugal or radial acceleration on the radial acceleration sensor 12, the slot 54 will clear the line of sight between the associated photo emitter and photo sensor so that the voltage on the lead 92.1, which is normally high, will drop to zero. This will cause the output of N1 to go high. (As will be seen in the drawing, the input terminals of N1 are bridged so that it will operate as an inverter). This in turn will cause the warning light L1 to be switched on via the buffer amplifier B1. Also, the D-terminal of the flip-flop FF1 will go high. A clock pulse from a source oscillator 124 is continuously fed to the clock terminal CK of FF1 via a connection 122. Accordingly, at the first high going edge of the clock pulse, the flip-flop FF1 will be set so that its Q terminal goes high. At this stage, with the flip-flop FF2 still being in its reset mode, both inputs of N2 will be high so that a low going resetting pulse is applied via A1 to the reset terminals R of the flip-flops FF3, FF4, and FF5, ensuring that all these flip-flops are reset. At the same time the D terminal of the flip-flop FF2 will go high so that a short time later, at the first low going edge of the clock pulse, the flip-flop FF2 will also be set via the inverter I1 so that its Q terminal goes high. Thereafter, once the centrifugal acceleration on the radial acceleration sensor 12 has dropped to a sufficiently low level again, the output of N1 and therefore also the D terminal of FF1 will again go low. This means that, at the first high going edge of the clock pulse the flip-flop FF1 will switch back to its reset mode in which its Q terminal and therefore also the D terminal of FF2 will go low. At this stage, with the flip-flop FF2 still in its set mode, both the inputs of A2 will be high so that an enabling pulse is fed to each of the gates N6, N7 and N8. Also, a short time later, at the first low going edge of the clock pulse, the flip-flop FF2 will also be switched back to its reset mode via the inverter I1 so that its Q terminal also goes low.

If, at any time during the period for which both the flip-flops FF1 and FF2 are in their set modes, the acceleration on the radial acceleration sensor 12 is such that the slot 56, but not also the slots 58 and 60, clears the line of sight between the associated photo emitter and photo sensor so that the voltage on the lead 92.2 drops to zero, the operation of the circuit will be as follows. When the voltage on the lead 92.2 drops to zero the output of N3 will go high so that, at the first high going edge of the clock pulse, the flip-flop FF3 will switch to its set mode. Its Q terminal will then go low, so that it latches itself in the set mode via N3. The flip-flops FF4 and FF5 will both remain in their reset modes. Accordingly, the Q terminal of FF4 will be high so that, at the end of the period for which both flip-flops FF1 and FF2 are in their set modes, ie when flip-flop FF1 switches back to its reset mode, the enabling pulse at the output of A2 will cause a low going counting pulse to be fed to the counter and display unit D1, causing it to register a single count.

It will be clear from the drawings that, if the acceleration on the radial acceleration sensor 12 is sufficiently high so that the slot 58 also clears the line of sight between its associated photo emitter and photo sensor, then both flip-flops FF3 and FF4 will be switched to and latch themselves in their set mode. Furthermore, if the acceleration is still higher, so that also the slot 60 clears the line of sight between its associated photo emitter and photo sensor, then all three of the flip-flops FF3, FF4, and FF5 will be switched to and latch themselves in their set modes. The connection of the flip-flops FF3, FF4 and FF5 to the gates N6, N7 and N8 is such that, if only the flip-flops FF3 and FF4 are switched to their set modes, then, upon the occurrence of an enabling pulse on the output of A2, a low going counting pulse will only be fed to the counter and display unit D2. If all three of the flip-flops FF3, FF4 and FF5 are in their set modes, then the enabling pulse on the output of A2 will only cause a low going counting pulse to be fed to the counter and display unit D3. If none of the flip-flops FF3, FF4 and FF5 are in their set modes, then the enabling pulse on the output of A2 will not cause a counting pulse to be fed to any of the counter and display units D1 through to D3.

Thus, depending on the highest degree of acceleration during the period of time for which both flip-flops FF1 and FF2 are in their set modes, none or a particular one of the three counter and display units D1, D2, and D3 will advance a count.

The circuitry associated with the counter and display units D4 and D5 is very similar to that associated with the counter and display circuits D1, D2 and D3 so that it will not be described in detail. The operation is briefly as follows. When there is sufficient deceleration on the linear acceleration sensor 10 the slot 92.5 will clear the line of sight between its associated photo emitter and photo sensor so that the warning light L2 will light up via the buffer amplifier B2. Also, depending on the highest degree of deceleration on the linear acceleration sensor 10 during the period of time for which the two flip-flops FF6 and FF7 are both in their set mode, a count will be registered on none or either one of the counter and display units D4 and D5.

If there is sufficient acceleration on the linear acceleration sensor 10 so that the slot 64 clears the line of sight between the associated photo emitter and photo sensor, the warning light L2 will also light up via the buffer amplifier B2. If the acceleration on the linear acceleration sensor 10 is still higher so that the slot 66 also clears the line of sight between its associated photo emitter and photo sensor, then the flip-flop FF10 will be switched to its set mode so that a low going counting pulse is fed from its Q terminal to the counter and display unit D6, causing it to register a count. The operation of the flip-flops FF6 and FF7 during linear acceleration will ensure that only a single count is registered when the slot 66 clears the line of sight between its associated photo emitter and photo sensor. It will only be possible to register a further count after the line of sight between this photo emitter and photo sensor has first been broken again.

I claim:

1. A monitoring system comprising:
   (A) a sensor responsive to acceleration in a predetermined plane and comprising
   a liquid-filled casing,
   a float structure immersed in the liquid in the casing and mounted for pivotal movement about a generally horizontal axis of rotation when the sensor is subjected to acceleration in the predetermined plane, the float structure comprising a pair of spaced floats having centres of bouyancy above and one on each side of the axis of rotation for biassing the float structure to a position in which a datum line movable with the float structure and passing through the axis of rotation adopts a datum position; and
   openings in the float structure at different distances from the axis of rotation, at least some of the openings terminating at different angular positions about the axis of rotation; and
   (B) means responsive to the sensor for indicating details of acceleration, the responsive means comprising detectors located in the casing at the same distances from the axis as respective openings and each having components on opposite sides of the structure for operating in a first mode when the float structure is interposed between the components and in a second mode when an opening is between the components so that the responsive means will detect differing degrees of acceleration in dependence on the degree of movement of the float structure.

2. A system according to claim 1, wherein the openings are elongate slots in the float structure and are located on each side of the datum line so that the system can detect both acceleration and deceleration, and wherein the detectors are located substantially in alignment with the datum position.

3. A system according to claim 2, wherein the slots are provided in replaceable elements in said float structure.

4. A system according to claim 3, wherein the components of each detector comprise a photo emitter located on one side of the float structure and photo sensor located on the other side of the float structure, the photo emitter directing a light beam towards the photo sensor.

5. A system according to claim 1, wherein the responsive means includes an electronic circuit having a plurality of display units each arranged to display and record details of signals received thereby when a respective predetermined range of acceleration is indicated by the float structure.

6. A system according to claim 5 wherein the electronic circuit includes means for the display units to display a signal, each time an acceleration sufficient to actuate a display device is indicated by the float structure, only in the display unit corresponding to the predetermined range of highest acceleration indicated by the float structure.

7. A system according to claim 5 wherein the responsive means includes means for switching on a warning indicator on a predetermined range of least acceleration being indicated by the float structure.

8. A monitoring system comprising:
   (a) a first sensor which is responsive to acceleration in a predetermined plane;
   (b) a second sensor which is responsive to acceleration in a plane transverse to the predetermined plane; and
   (c) means responsive to the sensors for indicating details of said accelerations;
   (d) wherein each sensor comprises a liquid-filled casing and a float structure arranged for rotation about a generally horizontal axis, the axes being transverse to one another;
   (e) wherein each float structure comprises a pair of spaced floats having centres of bouyancy spaced apart in a horizontal direction to lie one on each side of the respective axis and above the axis for biassing the float structure to a datum condition in which a datum line movable with the float structure and passing through said axis adopted a datum position, said float structure being movable in response to acceleration of the respective sensor;
   (f) wherein each float structure has slots at least some of which extend to different angular positions spaced from the datum line; and
   (g) wherein the means responsive to the sensors comprises detectors located in the casings of the two sensors at the same radial distances from the axes as respective slots in the float structure, the detectors in each sensor having components on opposite sides of the float structure of that sensor, the detector being adapted to operate in a first mode when the float structure is interposed between its components and in a second mode when the slots move between its components so that the detectors will detect differing degrees of acceleration in dependence on the degree of movement of the float structure.

9. A monitoring system according to claim 8, wherein the slots in each float structure are located on each side of the datum line thereof and wherein the detectors are arranged substantially in alignment with the datum position of the datum line.

10. A monitoring system according to claim 8 wherein the slots are provided in replaceable sections in said float structure.

* * * * *

UNITED STATES PATENT AND TRADEMARK OFFICE
CERTIFICATE OF CORRECTION

PATENT NO. : 4,242,910
DATED : January 6, 1981
INVENTOR(S) : Andries J. Stoltz

It is certified that error appears in the above-identified patent and that said Letters Patent are hereby corrected as shown below:

Column 1, line 5, "an" first occurrence should be --as--.

Column 5, line 6, "Q" first occurrence should be --$\overline{Q}$--.

Column 6, line 34, "Q" should be --$\overline{Q}$--.

Column 6, line 37, "Q" should be --$\overline{Q}$--.

Column 7, line 30, "Q" should be --$\overline{Q}$--.

Signed and Sealed this

First Day of December 1981

[SEAL]

*Attest:*

GERALD J. MOSSINGHOFF

*Attesting Officer*   *Commissioner of Patents and Trademarks*